(12) United States Patent
Mitsuhashi et al.

(10) Patent No.: US 9,490,476 B2
(45) Date of Patent: Nov. 8, 2016

(54) NONAQUEOUS ELECTROLYTE SECONDARY BATTERY AND MANUFACTURING METHOD THEREOF

(75) Inventors: Toshihiko Mitsuhashi, Toyota (JP); Koji Takahata, Toyota (JP); Akihiro Ochiai, Moriguchi (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 298 days.

(21) Appl. No.: 14/004,215

(22) PCT Filed: Mar. 11, 2011

(86) PCT No.: PCT/JP2011/055838
§ 371 (c)(1),
(2), (4) Date: Nov. 13, 2013

(87) PCT Pub. No.: WO2012/124033
PCT Pub. Date: Sep. 20, 2012

(65) Prior Publication Data
US 2014/0065478 A1    Mar. 6, 2014

(51) Int. Cl.
*H01M 4/22* (2006.01)
*H01M 4/1393* (2010.01)
*H01M 4/04* (2006.01)
*H01M 4/133* (2010.01)
*H01M 10/052* (2010.01)
*H01M 10/058* (2010.01)
*H01M 4/583* (2010.01)
*H01M 4/02* (2006.01)

(52) U.S. Cl.
CPC ......... *H01M 4/1393* (2013.01); *H01M 4/0404* (2013.01); *H01M 4/0435* (2013.01); *H01M 4/133* (2013.01); *H01M 4/583* (2013.01); *H01M 10/052* (2013.01); *H01M 10/058* (2013.01); *H01M 2004/021* (2013.01); *Y02E 60/122* (2013.01); *Y02P 70/54* (2015.11); *Y02T 10/7011* (2013.01)

(58) Field of Classification Search
CPC .. H01M 4/133; H01M 4/1393; H01M 4/583; H01M 10/0525
See application file for complete search history.

(56) References Cited

U.S. PATENT DOCUMENTS

2004/0072076 A1*  4/2004  Matsubara ............... H01B 1/24
                                                                429/231.8

FOREIGN PATENT DOCUMENTS

| JP | 2003-197189 | 7/2003 |
| JP | 2004-319312 | 11/2004 |

*Primary Examiner* — Stewart Fraser
*Assistant Examiner* — Olatunji Godo
(74) *Attorney, Agent, or Firm* — Finnegan, Henderson, Farabow, Garrett & Dunner, LLP (57) ABSTRACT

The present invention provides a method of manufacturing a nonaqueous electrolyte secondary battery in which graphite fissuring during rolling of the negative electrode mixture layer is prevented and a deterioration in the performance of the battery is thereby suppressed. The manufacturing method provided by the present invention is a method of manufacturing a nonaqueous electrolyte secondary battery that has a positive electrode and a negative electrode, and includes: a coating step of coating a current collector 22 with a positive electrode mixture 23 containing graphite 25; a magnetic field application step of applying, to the negative electrode mixture 23 made to coat the current collector 22 in the coating step, a magnetic field in which the magnetic lines of force are oriented in one direction parallel to the plane of the current collector 22 coated with the negative electrode mixture 23; a drying step of drying the negative electrode mixture 23 to which the magnetic field has been applied in the magnetic field application step; and a rolling step of rolling a negative electrode mixture layer resulted from the drying step.

7 Claims, 6 Drawing Sheets

NONAQUEOUS ELECTROLYTE SECONDARY BATTERY AND MANUFACTURING METHOD THEREOF

CROSS-REFERENCE TO RELATED APPLICATIONS

This application is a national phase application of International Application No. PCT/JP2011/055838, filed Mar. 11, 2011, the content of which is incorporated herein by reference.

TECHNICAL FIELD

The present invention relates to a nonaqueous electrolyte secondary battery and more particularly relates to a nonaqueous electrolyte secondary battery that is provided with a positive electrode and a negative electrode.

BACKGROUND ART

The importance of lithium secondary batteries, nickel-hydride batteries, and other nonaqueous electrolyte secondary batteries as vehicle-mounted power sources and as power sources for personal computers and mobile devices has been increasing in recent years. In particular, lithium secondary batteries, which are lightweight and provide a high energy density, are expected to be preferably used as high-output vehicle-mounted power sources. Lithium secondary batteries undergo charging and discharge through the transit of the Li ion back and forth between a positive electrode and a negative electrode.

In a typical structure for this type of lithium secondary battery, electrodes (a positive electrode and a negative electrode) that carry an electrode mixture layer containing an electrode active material are present on electrode current collectors. The negative electrode current collector used for the negative electrode is, for example, an elongated (this includes sheets and foils) member composed mainly of copper or a copper alloy. The negative electrode active material used for the negative electrode can be exemplified by graphite materials such as natural graphite, synthetic graphic, and amorphous carbons from natural and synthetic graphites. These graphite materials have a layer structure in which a plurality of layers are stacked, and charging and discharge proceed via the insertion of the lithium ion between these layers (into the interlayer) and extraction of the lithium ion from this interlayer.

Patent Literature 1 describes an art in which a graphite powder is solidified and molded into a sheet shape on a substrate (current collector) using a binder and at the same time the (002) plane in the graphite particles in the graphite powder is oriented perpendicular to the plane of the sheet. According to this art, because the (002) plane of the graphite particles present in the graphite powder is oriented in the direction of the positive electrode, the lithium ions that have migrated from the positive electrode can be smoothly inserted into the graphite interlayer.

CITATION LIST

Patent Literature

Patent Literature 1: Japanese Patent Application Laid-open No. 2003-197189

SUMMARY OF INVENTION

However, while the art disclosed in Patent Literature 1 can cause the layer plane (i.e., the (002) plane, which is the plane horizontal to the graphite layer) of the graphite in the negative electrode to be disposed perpendicular to the current collector, the individual graphite layer planes are disposed irregularly (multiple directions) with respect to the plane of the current collector. As a consequence, when the negative electrode mixture layer is rolled in the rolling step during fabrication of the negative electrode, the multidirectionally oriented graphite particles interfere (collide) with each other and fissuring and cracking can then be produced in the graphite. When fissuring and cracking are produced in the graphite, a new film is formed on this surface and lithium ions are consumed in association with this, and this can cause an increase in the irreversible capacity and/or a decline in the storage capacity.

The present invention was pursued considering this point and has as its main objects the introduction of a nonaqueous electrolyte secondary battery in which a deterioration in battery performance is suppressed by preventing the graphite from fissuring when the negative electrode mixture layer is rolled and the introduction of a favorable method of manufacturing this nonaqueous electrolyte secondary battery.

The method according to the present invention for manufacturing a nonaqueous electrolyte secondary battery is a method of manufacturing a nonaqueous electrolyte secondary battery that has a positive electrode and a negative electrode, and includes: a coating step of coating a current collector with a graphite-containing negative electrode mixture; a magnetic field application step of applying, to the negative electrode mixture made to coat the current collector in the coating step, a magnetic field in which magnetic lines of force are oriented in one direction parallel to a plane of the current collector coated with the negative electrode mixture; a drying step of drying the negative electrode mixture to which the magnetic field has been applied in the magnetic field application step; and a rolling step of rolling a negative electrode mixture layer resulted from the drying step.

Because, according to this manufacturing method, the negative electrode mixture made to coat the current collector in the coating step is subjected to a magnetic field in which the magnetic lines of force are oriented in one direction parallel to the plane of the current collector coated with the negative electrode mixture, the graphite in the negative electrode mixture becomes arrayed with an alignment of its orientation such that the layer plane of the graphite is parallel to the direction of the magnetic lines of force in the magnetic field (i.e., one direction parallel to the plane of the current collector). Such an orientation-aligned arraying of the graphite makes it possible to suppress the interference (collision) of the graphite particles with each other that can occur during the rolling step and thus makes it possible to prevent the fissuring and cracking of the graphite that accompanies this interference. Accordingly, the present invention can produce an optimal nonaqueous electrolyte secondary battery in which the performance deterioration induced by fissuring and cracking of the graphite is suppressed. This nonaqueous electrolyte secondary battery can have, for example, a high initial capacity and excellent high-temperature storage characteristics.

In a preferred embodiment of the herein disclosed method of manufacturing a nonaqueous electrolyte secondary battery, in the magnetic field application step a magnetic field is first applied in which the magnetic lines of force are oriented in the direction orthogonal to the plane of the current collector and a magnetic field is thereafter applied in which the magnetic lines of force are oriented in one direction parallel to the plane of the current collector. The graphite in the negative electrode mixture is even more regularly arranged by this application of a magnetic field in the direction orthogonal to the plane of the current collector followed by application of a magnetic field in one direction parallel to the plane of the current collector. Fissuring of the graphite during rolling can be even more effectively suppressed as a result.

In a preferred embodiment of the herein disclosed method of manufacturing a nonaqueous electrolyte secondary battery, the current collector is an elongated current collector. In addition, in the magnetic field application step, a magnetic field is applied in which the magnetic lines of force are oriented in the width direction of this elongated current collector (i.e., the direction that is orthogonal to the length direction of the elongated current collector and that runs from one long edge of the current collector to the other long edge). This construction enables an even more effective suppression of fissuring of the graphite during rolling.

In a preferred embodiment of the herein disclosed method of manufacturing a nonaqueous electrolyte secondary battery, the density of the negative electrode mixture layer after the rolling step is at least 1.1 g/cm$^3$. While a higher post-rolling density for the negative electrode mixture layer increases the interference between graphite particles and thereby facilitates fissuring and cracking in the graphite, the fissuring and cracking of the graphite associated with such a densification can be prevented in accordance with the present invention.

In a preferred embodiment of the herein disclosed method of manufacturing a nonaqueous electrolyte secondary battery, the strength (magnetic flux density) of the magnetic field applied to the negative electrode mixture in the magnetic field application step is at least 0.5 T. The graphite in the negative electrode mixture can be reliably and securely oriented in the desired direction by having the strength of the magnetic field applied to the negative electrode mixture in the magnetic field application step be at least 0.5 T. This graphite is favorably flake graphite or sphericalized graphite provided by sphericalizing such flake graphite.

The present invention also provides a nonaqueous electrolyte secondary battery as manufactured by any of the herein disclosed manufacturing methods. Thus, this is a nonaqueous electrolyte secondary battery that has a positive electrode and a negative electrode, wherein the negative electrode has an elongated current collector and a negative electrode mixture layer that contains at least graphite and is formed in the length direction of the current collector. The graphite in this negative electrode mixture layer is arranged such that the (002) plane of at least 50 mass % of the graphite is parallel to the width direction (i.e., the direction that is orthogonal to the length direction of the elongated current collector and that runs from one long edge of the current collector to the other long edge) of the current collector. This (002) plane of the graphite is the layer plane (plane horizontal with the graphite layer) of a layer-structured graphite (graphite crystal) and is the plane horizontal to the carbon network of the graphene sheet that constitutes this graphite. When this construction is implemented, there are few defects, e.g., fissuring and cracking, in the graphite in the negative electrode mixture layer and a high-performance nonaqueous electrolyte secondary battery is obtained.

In a preferred embodiment of the herein disclosed nonaqueous electrolyte secondary battery, the graphite in the negative electrode mixture layer is arranged such that the (002) plane of at least 50 mass % of the graphite is orthogonal to the plane of the current collector and parallel to the width direction of the current collector. When this construction is implemented, there are few defects, e.g., fissuring and cracking, in the graphite in the negative electrode mixture layer and an even higher performance nonaqueous electrolyte secondary battery is obtained. In addition, because the edge region (edge where a plurality of layers in the hexagonal plate crystal are stacked) of the graphite faces the positive electrode side, another favorable aspect is that the smooth insertion into the graphite interlayer of the ions that have migrated from the positive electrode is facilitated and the battery performance is thus raised.

In a preferred embodiment of the herein disclosed nonaqueous electrolyte secondary battery, the density of the negative electrode mixture layer is at least 1.1 g/cm$^3$ (for example, 1.1 to 1.7 g/cm$^3$ and more preferably at least 1.4 g/cm$^3$, for example, 1.4 to 1.7 g/cm$^3$). The implementation of this construction provides a nonaqueous electrolyte secondary battery having an even higher energy density.

This nonaqueous electrolyte secondary battery (for example, a lithium secondary battery) is suitable—due to its higher performance due to the presence of few defects, e.g., fissuring and cracking, in the graphite in the negative electrode mixture layer—as, for example, a battery mounted in a vehicle, e.g., an automobile. Thus, a vehicle provided with any herein disclosed nonaqueous electrolyte secondary battery (this can be in the form of a battery pack in which a plurality of nonaqueous electrolyte secondary batteries are connected) is provided according to the present invention. In particular, a vehicle (for example, an automobile) is provided in which this nonaqueous electrolyte secondary battery is installed as a power source (typically as a power source in a hybrid vehicle or an electric vehicle).

DESCRIPTION OF EMBODIMENTS

Embodiments according to the present invention are described in the following with reference to the figures.

These figures are described using the same reference sign for a member or location that has the same function. The dimensional relationships (length, width, thickness, and so forth) in the figures do not reflect actual dimensional relationships. In addition, matters (e.g., general matters in relation to, for example, methods for preparing the separator or electrolyte or the architecture of the nonaqueous electrolyte secondary battery) required for the execution of the invention, but not included in the matters particularly described in this Description, can be understood as design matters for the individual skilled in the art based on the conventional art in the pertinent field.

<The First Embodiment>

A method of manufacturing a nonaqueous electrolyte secondary battery according to an embodiment of the present invention is described in the following. While not being a particular limitation, the present invention is described in detail in the following using the example of a lithium secondary battery (lithium ion battery). This method of manufacturing a lithium secondary battery includes a coating step, a magnetic field application step, a drying step, and a rolling step as one procedure for a method of manufacturing a battery. The coating step is a step of coating a current collector with a graphite-containing negative electrode mixture. The magnetic field application step is a step of applying, to the negative electrode mixture made to coat the current collector in the coating step, a magnetic field in which the magnetic lines of force are oriented in one direction parallel to the plane of the current collector coated with the negative electrode mixture. The drying step is a step of drying the negative electrode mixture to which the magnetic field has been applied in the magnetic field application step. The rolling step is a step of rolling the negative electrode mixture layer resulted from the drying step.

The negative electrode mixture used in the method of manufacturing a lithium secondary battery according to an embodiment of the present invention is a slurry in which at least graphite particles (the negative electrode active material) are dispersed in a solvent. The graphite particles (negative electrode active material) present in this slurry encompass, for example, graphitic materials (graphite), graphitization-resistant carbonaceous materials (hard carbon), easily-graphitized carbonaceous materials (soft carbon), natural graphite, and materials provided by executing an amorphous carbon coating on the surface of a natural graphite. Among the preceding, the use is preferred of a negative electrode active material in which natural graphite or artificial graphite is the main component (typically a negative electrode active material composed substantially of natural graphite or artificial graphite). This graphite can be flat flake graphite. The flat flake graphite is favorable from the standpoint of being able to achieve a stable orientation of the graphite in the negative electrode mixture in the magnetic field application step, vide infra. Or, a sphericalized graphite provided by sphericalizing flat flake graphite may also be used.

The negative electrode mixture may optionally contain one or two or more of the materials that can be used as a constituent component of the negative electrode mixture layer in common lithium secondary batteries. A binder is an example of such a material. This binder can be exemplified by styrene-butadiene rubber (SBR), carboxymethyl cellulose (CMC), polytetrafluoroethylene (PTFE), polyethylene (PE), and polyacrylic acid (PAA). Or, a resin composition, e.g., with polyvinylidene fluoride (PVDF), may be used.

The solvent for dispersing or dissolving the graphite particles and binder can be exemplified by organic solvents such as N-methylpyrrolidone (NMP), pyrrolidone, methyl ethyl ketone, methyl isobutyl ketone, cyclohexanone, toluene, dimethylformamide, dimethylacetamide, and so forth, and by combinations of two or more of the preceding. Or, this may be water or a mixed solvent composed mainly of water. One or two or more suitable selections from organic solvents that are uniformly miscible with water (e.g., lower alcohols, lower ketones) may be used as the solvent other than water present in such a mixed solvent. The content of the solvent in the negative electrode mixture is not particularly limited, but viewed from the standpoint of the coatability is preferably approximately 40 mass % to 60 mass % of the negative electrode mixture (slurry) as a whole. This solvent content is also favorable from the standpoint of being able to achieve a stable orientation of the graphite in the negative electrode mixture in the magnetic field application step, vide infra.

The current collector coated with the negative electrode mixture is not particularly limited and may be the same as the current collectors used for the negative electrode in conventional lithium secondary batteries. For example, a copper foil or other elongated (sheet-shaped) metal foil suitable for negative electrodes is favorably used for the current collector. In addition, the current collector is not necessarily limited to metal foils. For example, the current collector may be a resin formulated to be electroconductive. For example, a film provided by the vapor deposition of copper on a polypropylene film may be used as an electroconductive resin.

Figure 1:
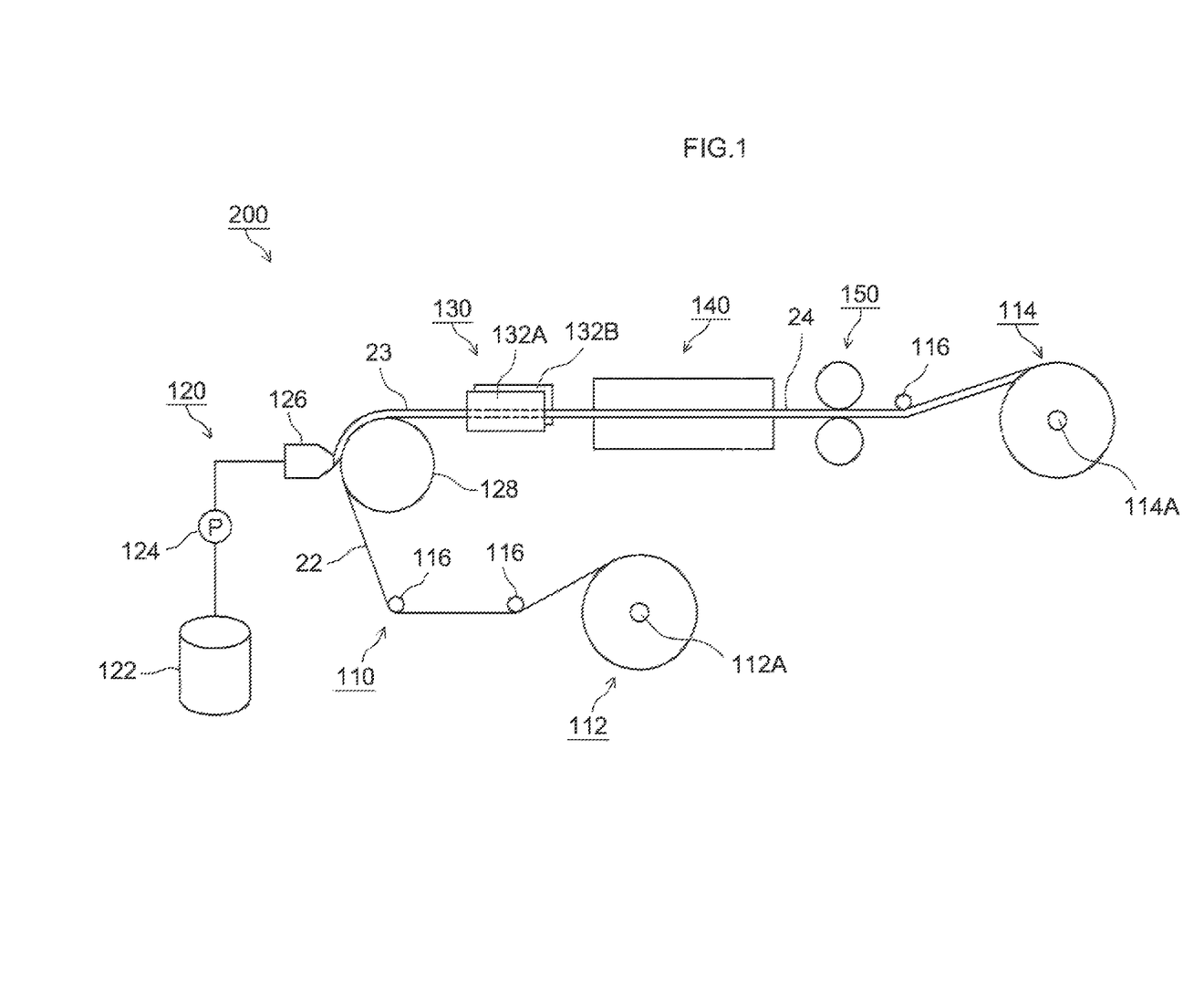
FIG. 1 is a diagram that shows a device for manufacturing a nonaqueous electrolyte secondary battery according to an embodiment of the present invention.

After the negative electrode mixture has been made to coat the current collector (coating step), the negative electrode for the lithium secondary battery according to this embodiment can be produced by proceeding through the magnetic field application step, drying step, and rolling step. FIG. 1 is a diagram that shows a manufacturing apparatus that realizes the indicated method of manufacturing a negative electrode for a lithium secondary battery. This manufacturing apparatus 200 is provided with a running path 110, a supply section 112, a recovery section 114, a mixture coating apparatus 120, a magnetic field application apparatus 130, a drying apparatus 140, and a rolling apparatus 150.

The running path 110 is a path along which a current collector 22 runs. In this embodiment, a plurality of guide rollers 116 are disposed along the prescribed path along which the current collector 22 runs. In this embodiment, the current collector runs over the plurality of guide rollers in sequence and a prescribed tension is thereby applied to the current collector 22. A drive mechanism (not shown) that turns the roller is attached to some of the guide rollers. The configuration is such that the current collector 22 can be transported by the rotation of these guide rollers in one direction.

A supply section 112 that supplies the current collector 22 is disposed at the starting end of the running path 110. The current collector 22, which has previously been wound on a winding core 112A, is disposed in the supply section 112. A suitable amount of the current collector 22 is supplied as appropriate from the supply section 112 to the running path 110. In addition, a recovery section 114 that takes up the current collector 22 is disposed at the end of the running path 110. At the recovery section 114, the current collector 22; on which prescribed treatments have been executed in the running path 110, is wound up on the winding core 114A. The following are disposed in the given sequence in this running path 110: a mixture coating apparatus 120, a magnetic field application apparatus 130, a drying apparatus 140, and a rolling apparatus 150.

The mixture coating apparatus 120, which executes the coating step, is an apparatus that coats the current collector 22 with the negative electrode mixture 23. In this embodiment, the mixture coating apparatus 120 is configured to coat an elongated current collector 22 in the length direction with the negative electrode mixture 23. This mixture coating apparatus can be exemplified by a die coater coating apparatus as shown in FIG. 1. At the die coater coating apparatus 120, the negative electrode mixture 23 is held in a tank 122, and the negative electrode mixture 23 is suctioned out by a pump 124 and is fed to a die 126. The current collector 22, while being transported by the rotation of a back-up roll 128, is passed through a gap (the coating gap) between the back-up roll 128 and the die 126, thereby forming a coating of the negative electrode mixture 23 from the die 126 on the surface of the current collector 22. This die coater coating apparatus 120 can continuously coat the current collector 22 in the length direction with the negative electrode mixture 23 while adjusting the areal amount of the coating composed of the negative electrode mixture 23.

Figure 2:
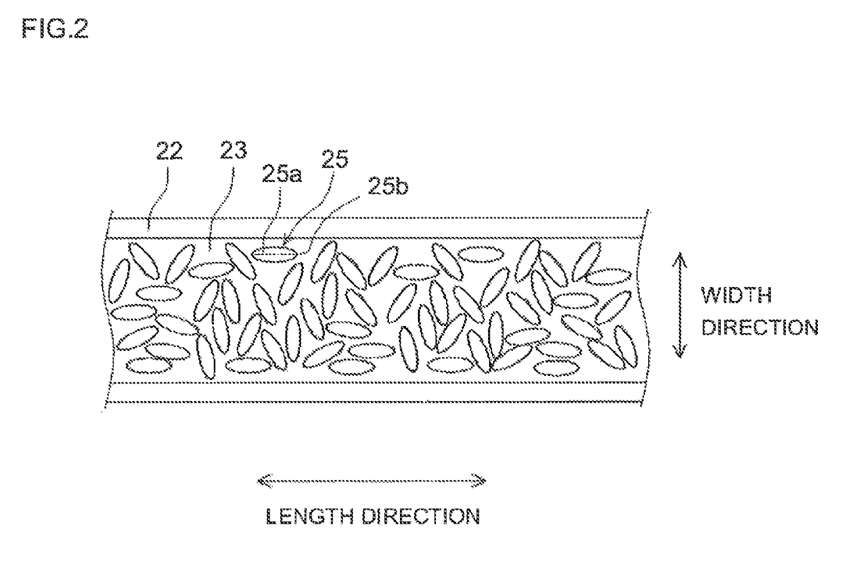
FIG. 2 is a schematic diagram that shows the top of the current collector after the coating step according to an embodiment of the present invention.

FIG. 2 is a top view (perpendicular direction) of the current collector 22 after this coating step. As shown in FIG. 2, in this embodiment, the elongated current collector 22 is coated with the negative electrode mixture 23 in the length direction and graphite 25 is incorporated as the negative electrode active material in the negative electrode mixture 23. The graphite 25 in this embodiment is flat flake graphite. This flat flake graphite 25 has an edge 25b that is an edge where a plurality of layers 25a in the hexagonal plate crystal (graphene sheet) are stacked and exposed. As shown in FIG. 2, in the state supplied from the mixture coating apparatus 120 the graphite 25 in the negative electrode mixture 23 is oriented in random (nonregular) directions. FIG. 2 schematically shows the top of the current collector 22 after the coating step, and, for example, the shape and size of the graphite 25 is different from that in actual practice. The current collector 22 to which the negative electrode mixture 23 has been supplied in the coating step is transported to the magnetic field application step.

Figure 3:
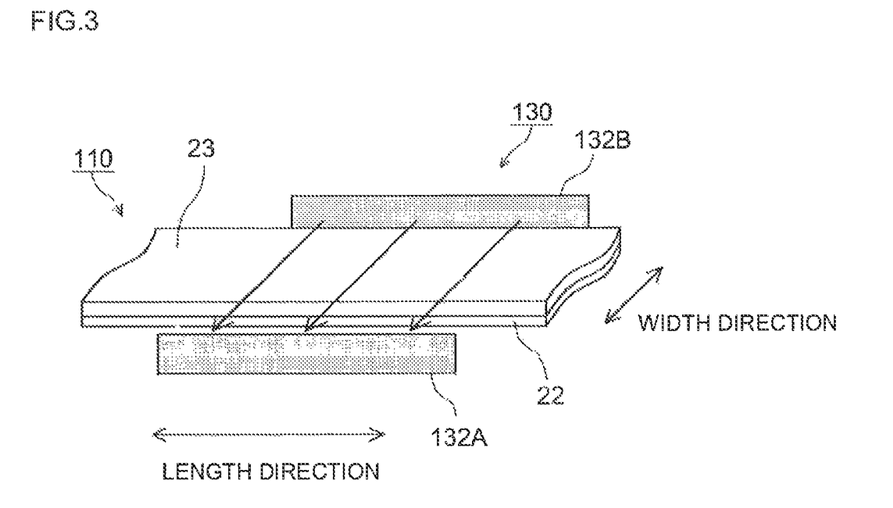
FIG. 3 is a perspective diagram that schematically shows a magnetic field application apparatus according to an embodiment of the present invention.

The magnetic field application apparatus 130, which executes the magnetic field application step, is an apparatus that subjects the negative electrode mixture 23 made to coat a metal foil functioning as the current collector 22 to a magnetic field in which the magnetic lines of force are oriented in one direction parallel to the plane of the current collector 22 coated with the negative electrode mixture 23. In this embodiment, the magnetic field application apparatus 130, as shown in FIG. 3, is composed of a pair of magnets 132A, 132B that are disposed on the two outer sides of the width direction of the current collector 22 and that between them sandwich the current collector 22 running along the running path 110. The magnets 132A, 132B may be composed of permanent magnets or may be electromagnets that produce magnetic force by the action of electricity. One of the pair of magnets 132A, 132B disposed on the two outer sides of the width direction of the current collector 22 forms the S pole and the other forms the N pole. These magnets 132A, 132B apply to the current collector 22 running in the running path 110 a magnetic field in which the magnetic lines of force are oriented in the width direction of the current collector 22 (i.e., the direction which is orthogonal to the length direction of the elongated current collector 22 and which runs from one long edge of the current collector 22 to the other long edge).

Figure 4:
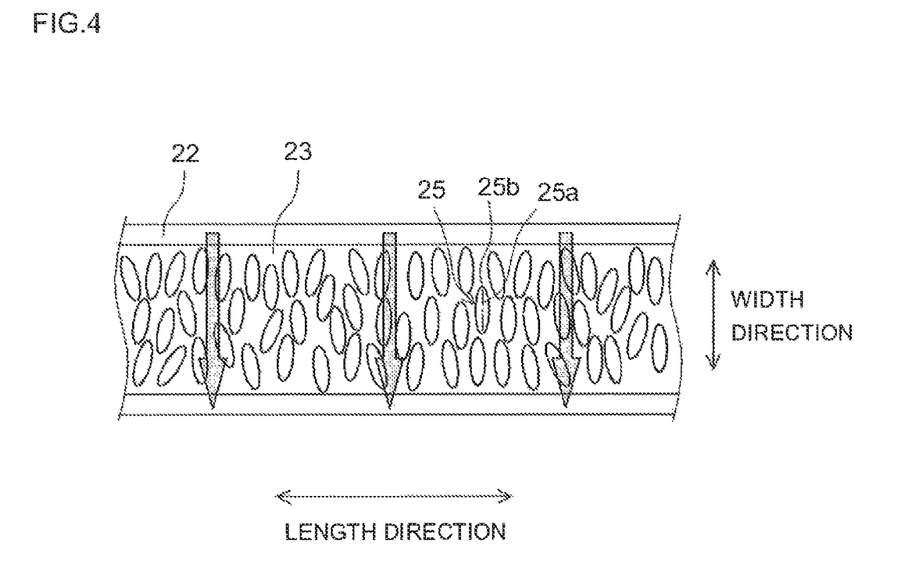
FIG. 4 is a schematic diagram that shows the top of the current collector after the magnetic field application step according to an embodiment of the present invention.

This magnetic field application step results in the orientation, through the action of the magnetic field, of the graphite 25 in the negative electrode mixture 23 made to coat the current collector 22. FIG. 4 is a diagram in which the current collector 22 is seen from above (upper side in the perpendicular direction) after this magnetic field application step. As shown in FIG. 4, in this embodiment, the elongated current collector 22 is coated with the negative electrode mixture 23 in the length direction and graphite 25 is incorporated as the negative electrode active material in this negative electrode mixture 23. When the magnetic field having its magnetic lines of force oriented in the width direction of the current collector 22 acts on this current collector 22, the graphite 25 in the negative electrode mixture 23 becomes arrayed with an alignment of its orientation such that the layer plane 25a of the graphite 25 is parallel to the width direction of the current collector 22. Stated differently, the graphite 25 is regularly arrayed with the edge 25b facing the outer sides in the width direction of the current collector 22.

The preferred magnetic field strength in the magnetic field application step may also vary as a function of, for example, the viscosity and solids content of the negative electrode mixture 23. As one yardstick, for example, a magnetic field strength can be established whereby at least 50 mass % of the graphite in the negative electrode mixture can be arranged such that the layer plane in the graphite (i.e., the (002) plane, which is the plane horizontal to the layers in the hexagonal plate crystal) is parallel to the width direction of the current collector 22. In a preferred embodiment, the magnetic field strength in the neighborhood where the negative electrode mixture 23 runs in the running path 110 is approximately at least 0.5 T and more preferably is at least 0.75 T and is even more preferably at least 1.0 T. In addition, the time during which the magnetic field acts on the negative electrode mixture 23 is, for example, 0.5 seconds to 5 seconds (for example, 0.5 seconds to 1 second), more preferably 1 second to 5 seconds (for example, 1 second to 2 seconds), and particularly preferably 2 seconds to 5 seconds.

The negative electrode mixture 23, since it is attached to the current collector 22 as described have, has a suitable range for its viscosity. Viewed from the standpoint of the coatability, a preferred viscosity range for the negative electrode mixture is, for example, approximately 500 mPa·s to 10000 mPa·s (B-type viscosity, 25° C., 20 rpm). This viscosity range is also favorable from the standpoint of being able to achieve a stable orientation of the graphite in the negative electrode mixture in the magnetic field application step.

The current collector 22 in which the graphite in the negative electrode mixture 23 has been oriented by the magnetic field application step is transported along the running path 110 to the drying step. The magnetic field application step is favorably carried out as soon as possible after the negative electrode mixture 23 has been supplied to the current collector 22 in the mixture coating step.

The drying apparatus 140, which executes the drying step, is an apparatus that dries the negative electrode mixture 23 to which the magnetic field has been applied in the magnetic field application step. The drying apparatus 140 can be freely selected from those conventionally used in the production of the negative electrode for common lithium secondary batteries. For example, a convection drying oven (the present embodiment) or an infrared drying oven can be used. The convection drying oven 140 can be, for example, a convection drying oven that blows in a gas that has been heated by a suitable heat source (for example, a heater). There are no particular limitations on the type of injected gas, and, for example, it may be air or an inert gas such as N$_2$ gas or He gas. Exposing the current collector 22 to such a high-temperature drying atmosphere results in the volatilization and removal of the solvent in the negative electrode mixture 23 made to coat the current collector 22. A negative electrode mixture layer 24 (FIG. 1) can be obtained as a consequence. The current collector 22 on which the negative electrode mixture layer 24 has been formed is transported along the running path 110 to the rolling step.

The rolling apparatus 150, which executes the rolling step, is an apparatus that rolls (presses) the negative electrode mixture layer 24 obtained in the drying step. The rolling apparatus 150 can be freely selected from those conventionally used in the production of the negative electrode for common lithium secondary batteries. For example, a roll press (the present embodiment) or a platen press can be used. This rolling step can provide a suitable adjustment in the thickness and mixture density of the negative electrode mixture layer 24 yielded by the drying step. In a preferred embodiment, the pressure (press pressure) used to roll the negative electrode mixture layer in this rolling step is at least 3 MN/m$^2$ (generally 3 MN/m$^2$ to 14 MN/m$^2$, for example, 7 MN/m$^2$ to 14 MN/m$^2$).

The conventional procedures for manufacturing a negative electrode lack the magnetic field application step that has been described above (i.e., the step in which a magnetic field is applied in which the magnetic lines of force are oriented in one direction parallel to the plane of the current collector 22 that has been coated with the negative electrode mixture 23), and because of this the layer planes 25a and edges 25b of the graphite 25 are, as shown in FIG. 2, oriented irregularly (multiple directions) with respect to the plane of the current collector 22. As a consequence, when the negative electrode mixture layer 24 is rolled in the rolling step described above, the particles of the multidirectionally oriented graphite 25 interfere (collide) with each other and fissuring and cracking can then be produced in the graphite 25. When fissuring and cracking are produced in the graphite 25, a new film is formed on this surface and lithium ions are consumed in association with this, and this can cause an increase in the irreversible capacity and/or a decline in the storage capacity.

In contrast, in accordance with the present embodiment at least 50 mass % (preferably 70 mass % and particularly preferably 90 mass %) of the graphite in the negative electrode mixture layer becomes arrayed with an alignment of its orientation such that the layer plane of the graphite is parallel to the width direction of the current collector, i.e., the (002) plane of the graphite is parallel to the width direction of the current collector. Such an orientation-aligned arraying of the graphite 25 makes it possible to suppress the interference (collision) of the graphite 25 particles with each other that can occur during the rolling step and thus makes it possible to prevent the fissuring and cracking of the graphite that accompanies this interference. Accordingly, this construction can produce an optimal lithium secondary battery in which the performance deterioration induced by fissuring and cracking of the graphite 25 is suppressed. This lithium secondary battery can have, for example, a high initial capacity and an excellent capacity retention rate after high-temperature storage. The "(002) plane of the graphite is parallel to the width direction of the current collector" referenced here does not necessarily require—as long as the effects of this construction are achieved—that the (002) plane of the graphite be perfectly parallel to the width direction of the current collector. For example, within ±20° of the perfectly parallel disposition is preferred and within ±10° is particularly preferred.

This embodiment has, as shown in FIG. 3, used an example in which a magnetic field is applied in which the magnetic lines of force are oriented in the width direction of the current collector 22; however, there is no limitation to this. The magnetic field applied to the negative electrode mixture 23 may be a magnetic field in which the magnetic lines of force are oriented in one direction parallel to the plane of the current collector 22 (typically a magnetic field in which the magnetic lines of force are oriented in the horizontal direction). For example, a magnetic field may be applied in which the magnetic lines of force are oriented in the length direction of the elongated current collector, or a magnetic field may be applied that has magnetic lines of force that diagonally traverse the elongated current collector. Among these embodiments, the embodiment in which a magnetic field is applied in which the magnetic lines of force are oriented in the width direction of the current collector, as in the embodiment that has been described in the preceding, is preferably used from the standpoint of more effectively suppressing the fissuring of the graphite during rolling.

In a herein disclosed preferred embodiment, the magnetic field application step and the drying step may be carried out simultaneously. That is, the magnetic field application step and drying step may be carried out at the same time, wherein a magnetic field in which the magnetic lines of force are oriented in the width direction of the current collector 22 may be applied to the negative electrode mixture 23 made to coat the current collector 22 in the coating step, and, in combination with this, the negative electrode mixture 23 may be dried with this magnetic field being applied. Such a drying of the negative electrode mixture 23 with the magnetic field applied to the negative electrode mixture 23 can prevent the displacement of the graphite 25 that can occur in the drying step and can thus favorably retain the state of orientation of the graphite 25 in the negative electrode mixture 23.

<The Second Embodiment>

Another embodiment according to the present invention is described in the following. This embodiment differs from the embodiment described above in that, in the magnetic field application step, a magnetic field in which the magnetic lines of force are oriented in the direction orthogonal to the plane of the current collector 22 is applied prior to the application of the magnetic field in which the magnetic lines of force are oriented in the width direction of the current collector 22.

Figure 5:
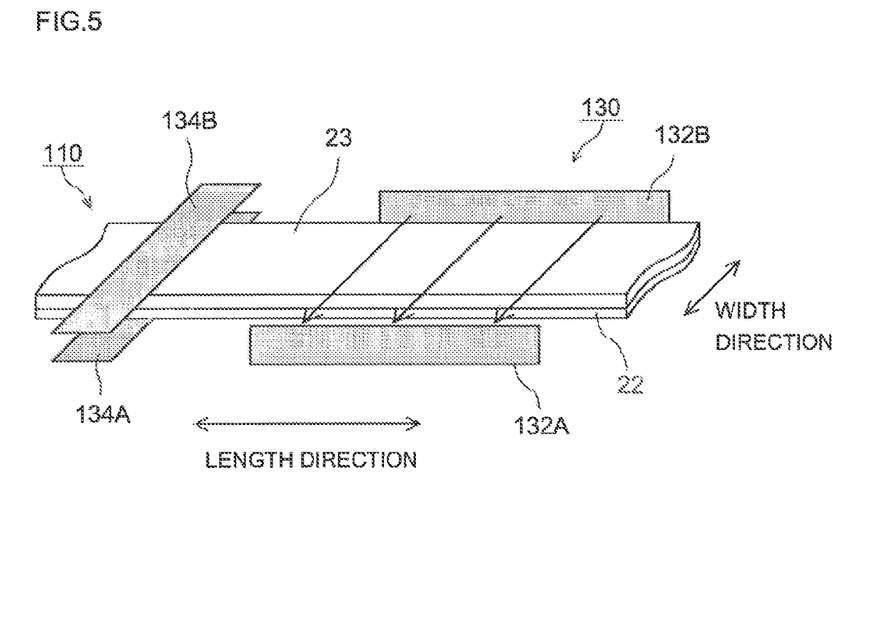
FIG. 5 is a perspective diagram that schematically shows a magnetic field application apparatus according to an embodiment of the present invention.

That is, as shown in FIG. 5, in this embodiment the magnetic field application apparatus 130, which executes the magnetic field application step, is additionally provided with a pair of magnets 134A, 134B upstream from the pair of magnets 132A, 132B that are disposed on the two outer sides of the width direction of the current collector 22 and that between them sandwich the current collector 22 running along the running path 110. The magnets 134A, 134B are disposed facing each other so as to sandwich the current collector 22 running along the running path 110 from the top and bottom. The magnets 134A, 134B may be composed of permanent magnets or may be electromagnets that generate magnetic force through the action of electricity. In this case, the current collector 22 running in the running path 110 is subjected to a magnetic field in which the magnetic lines of force are oriented in the direction orthogonal to the current collector 22.

Figure 6:
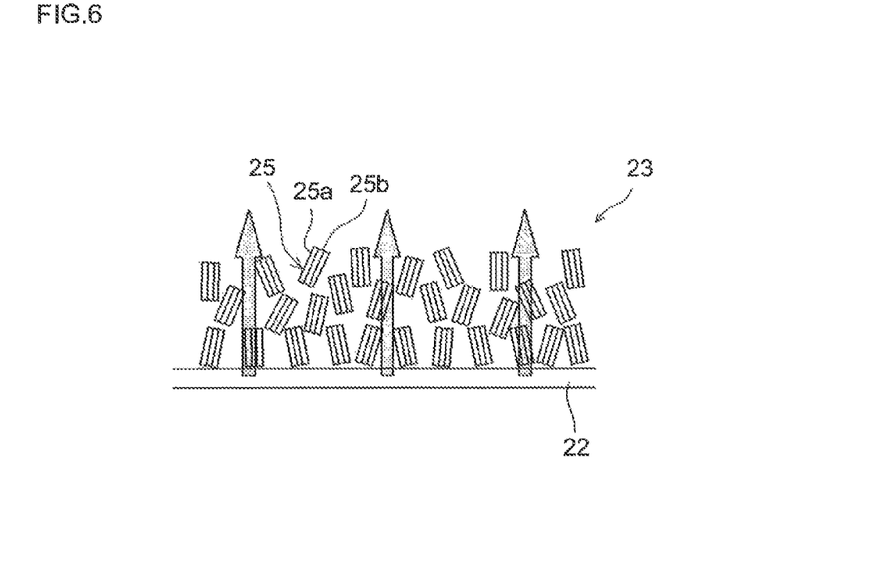
FIG. 6 is a schematic diagram that shows a cross section of the current collector after the magnetic field application step according to an embodiment of the present invention.

In this magnetic field application step, the negative electrode mixture 23 made to coat the current collector 22 is first subjected, by the magnets 134A, 134B, to a magnetic field in which the magnetic lines of force are oriented in the direction orthogonal to the surface (wide side) of the current collector 22. FIG. 6 shows the cross section of the current collector 22 after the application of this magnetic field. When the magnetic field having its magnetic lines of force oriented in the direction orthogonal to the current collector 22 acts on this current collector 22, the graphite 25 in the negative electrode mixture 23 becomes arrayed with an alignment of its orientation such that the layer plane 25a of the graphite 25 is orthogonal to the plane of the current collector 22. Stated differently, the graphite 25 is regularly arrayed with the edge 25b facing the surface of the current collector 22.

The current collector 22 provided with the negative electrode mixture 23 that has been subjected to a magnetic field by the magnets 134A, 134B is then transported into the region wherein the magnets 132A, 132B are disposed. A magnetic field in which the magnetic lines of force are oriented in the width direction of the current collector 22 is also applied by the magnets 132A, 132B. As previously described, under the action of a magnetic field in which the magnetic lines of force are oriented in the width direction of the current collector 22, the graphite 25 becomes arrayed so that the layer plane 25a of the graphite is parallel to the width direction of the current collector 22.

Through the execution of the magnetic field application step described above in accordance with the construction of the present embodiment, at least 50 mass % (preferably 70 mass % and particularly preferably 90 mass %) of the graphite in the negative electrode mixture layer becomes arrayed with an alignment of its orientation such that the layer plane of the graphite is orthogonal to the plane of the current collector and is parallel to the width direction of the current collector, i.e., the (002) plane of the graphite is orthogonal to the plane of the current collector and parallel to the width direction of the current collector. When this construction is executed, the graphite 25 becomes more regularly arranged than in the previously described first embodiment and as a result fissuring of the graphite 25 during rolling can be more effectively suppressed. In addition, because the edge 25b of the graphite 25 faces the positive electrode side when this construction is executed, another favorable aspect is that the smooth insertion between the layers 25a of the graphite 25 of the lithium ions that have migrated from the positive electrode is facilitated and the battery performance is thus raised. The "(002) plane of the graphite is orthogonal to the plane of the current collector" referenced here does not necessarily require—as long as the effects of this construction are achieved—that the (002) plane of the graphite form a perfect right angle (90°) with the plane of the current collector. For example, within ±20° of a perfectly right angular disposition is preferred and within ±10° is particularly preferred.

The strength of the magnetic field that is applied in this magnetic field application step in the direction orthogonal to the plane of the current collector may also vary as a function of, for example, the viscosity and solids content of the negative electrode mixture 23. As one yardstick, for example, a magnetic field strength can be established whereby at least 50 mass % of the graphite in the negative electrode mixture can be arranged such that the (002) plane in the graphite is orthogonal to the plane of the current collector and parallel to the width direction of the current collector. In a preferred embodiment, the magnetic field strength in the neighborhood where the negative electrode mixture 23 runs in the running path 110 is approximately at least 0.5 T and more preferably is at least 0.75 T and is even more preferably at least 1.0 T.

In the embodiment described above, the application of the magnetic field in the direction orthogonal to the current collector is followed by the application of the magnetic field in the width direction of the current collector, but this sequence of application may be reversed. That is, the magnetic field in which the magnetic lines of force are oriented in the direction orthogonal to the plane of the current collector 22 may be applied after the application of the magnetic field in which the magnetic lines of force are oriented in the width direction of the current collector 22. However, viewed from the perspective of achieving a more effective suppression of graphite fissuring during rolling, the use is preferred of the embodiment in which the application of the magnetic field in which the magnetic lines of force are oriented in the direction orthogonal to the plane of the current collector 22 is followed by the application of the magnetic field in which the magnetic lines of force are oriented in the width direction of the current collector 22, as in the embodiment just described above.

In addition, the application of the magnetic field in the direction orthogonal to the current collector and the application of the magnetic field in the width direction of the current collector may as necessary be repeated in alternation a plurality of times (for example, 2 to 5 times). For example, the magnetic field in which the magnetic lines of force are oriented in the direction orthogonal to the plane of the current collector 22 may additionally be applied after the application by the magnets 132A, 132B of the magnetic field in which the magnetic lines of force are oriented in the width direction of the current collector 22. An even more regular orientation of the direction of the graphite 25 can be brought about by the repetition in alternation of such a bidirectional application of magnetic fields. However, when viewed from the standpoint of simplifying the structure of the apparatus, the application of the magnetic field in the direction orthogonal to the current collector and the application of the magnetic field in the width direction of the current collector are preferably performed once each, as in the embodiment just described above.

Below, an embodiment of a lithium secondary battery constructed using a negative electrode (negative electrode sheet) 20 produced using the method described in the preceding is described with reference to the schematic diagrams in FIGS. 7 and 8.

Figure 7:
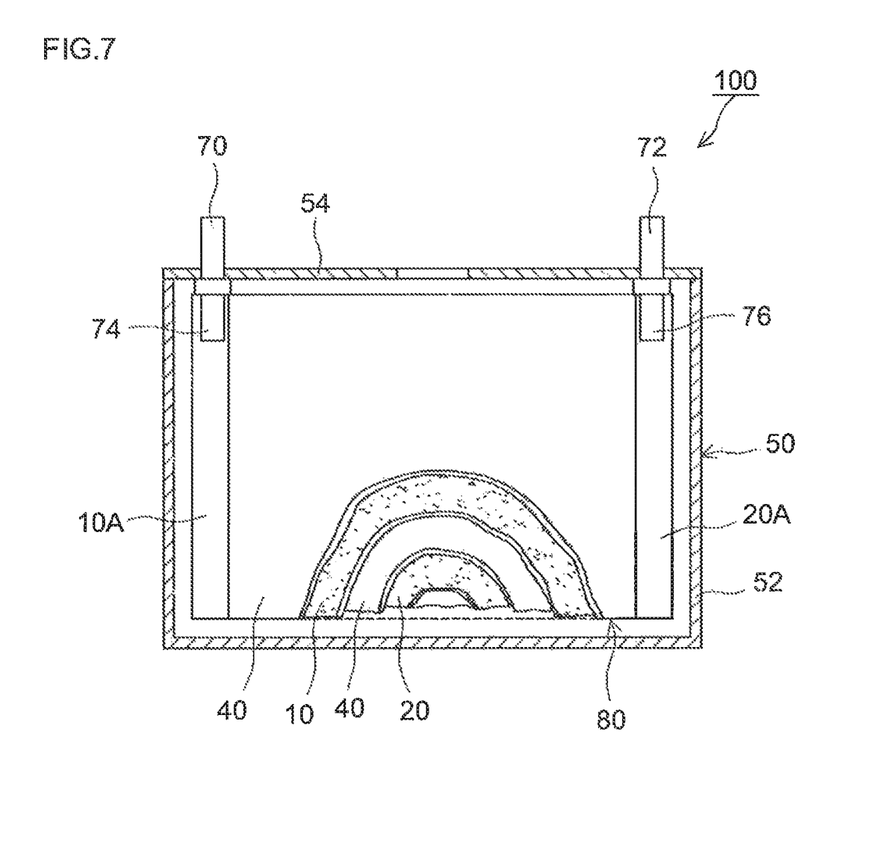
FIG. 7 is a schematic diagram that shows a nonaqueous electrolyte secondary battery according to an embodiment of the present invention.

As shown in FIG. 7, the lithium secondary battery 100 according to this embodiment has a structure in which an electrode assembly (wound electrode assembly) 80—including an elongated positive electrode sheet 10 and an elongated negative electrode sheet 20 wound flat with an elongated separator 40 interposed therebetween—is held, along with a nonaqueous electrolyte solution not shown in the figures, in a container 50 having a shape that can accommodate the wound electrode assembly 80 (a flat box shape).

The container 50 is provided with a container main body 52, which has the shape of a flat rectangular parallelepiped and is open at one end, and with a lid 54 that closes this opening. A metal such as aluminum or steel is preferably used for the material of the container 50 (aluminum is used in the present embodiment). Or, the container 50 may be provided by molding a resin, e.g., a polyphenylene sulfide resin (PPS), polyimide resin, and so forth. A positive electrode terminal 70, which electrically connects to the positive electrode of the wound electrode assembly 80, and a negative electrode terminal 72, which electrically connects to the negative electrode 20 of this electrode assembly 80, are disposed on the top side of the container 50 (i.e., in the lid 54). The flat wound electrode assembly 80 is housed, along with a nonaqueous electrolyte solution that is not shown in the figures, within the container 50.

With the exception that the graphite in the negative electrode has been magnetically oriented as described above, the materials and members constituting the wound electrode assembly 80 having the above-described structure are as such not particularly limited and may be the same as in the electrode assembly in a conventional lithium secondary battery.

Figure 8:
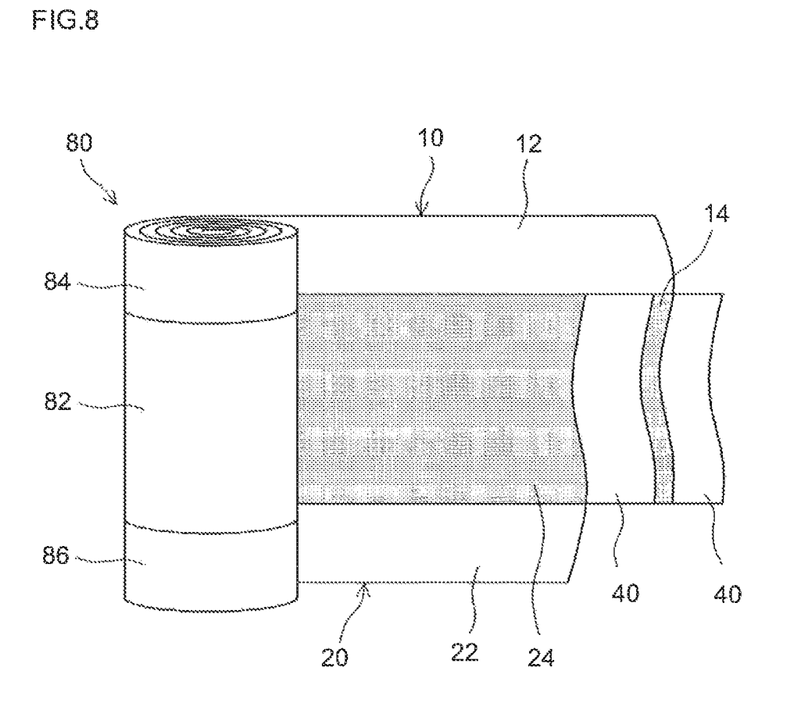
FIG. 8 is a schematic diagram that shows a wound electrode assembly according to an embodiment of the present invention.

The wound electrode assembly 80 according to this embodiment is the same as the wound electrode assembly in a common lithium secondary battery and, as shown in FIG. 8, has an elongated (ribbon-shaped) sheet structure in the stage prior to assembly of the wound electrode assembly 80.

The positive electrode sheet 10 has a structure in which a positive electrode mixture layer 14 containing a positive electrode active material is carried on both sides of a foil-shaped and elongated sheet-shaped positive electrode current collector 12 (referred to below as the "positive electrode current collector foil"). However, the positive electrode mixture layer 14 is not attached to one side edge, considered in the width direction, of the positive electrode sheet 10 (the upper side edge region in the figure), resulting in the formation of a positive electrode mixture layer-free region where the positive electrode current collector 12 is exposed over a prescribed width.

A single selection or two or more selections from the materials heretofore used in lithium secondary batteries can be used without particular limitation for the positive electrode active material. Preferred examples for the herein disclosed art are positive electrode active materials in which the main component is an oxide that contains lithium and a transition metal element as its constituent metal elements (i.e., a lithium transition metal oxide), e.g., lithium nickel oxide ($LiNiO_2$), lithium cobalt oxide ($LiCoO_2$), lithium manganese oxide ($LiMn_2O_4$), and so forth. The use is preferred thereamong of a positive electrode active material in which the main component is a lithium nickel cobalt manganese complex oxide, for example, $LiNi_{1/3}Co_{1/3}Mn_{1/3}O_2$ (typically a positive electrode active material composed substantially of a lithium nickel cobalt manganese complex oxide).

The positive electrode mixture layer 14 may as necessary contain a single selection or two or more selections from the materials that can be used as constituent components of the positive electrode mixture layer in ordinary lithium secondary batteries. An electroconductive material is an example of such a material. A carbon material such as a carbon powder or carbon fiber is preferably used as this electroconductive material. Or, an electroconductive metal powder, e.g., nickel powder, may be used. Another material that can be used as a component of the positive electrode mixture layer includes various polymer materials capable of functioning as a binder for the constituent materials referenced above.

Like the positive electrode sheet 10, the negative electrode sheet 20 also has a structure in which a negative electrode mixture layer 24 containing a negative electrode active material is carried on both sides of a foil-shaped and elongated sheet-shaped negative electrode current collector 22. However, the negative electrode mixture layer 24 is not attached to one side edge, considered in the width direction, of the negative electrode sheet 20 (the lower side edge region in the figure), resulting in the formation of a negative electrode mixture layer-free region where the negative electrode current collector 22 is exposed over a prescribed width. The materials constituting the negative electrode current collector 22 and the negative electrode mixture layer 24 are as described above, and a duplicate explanation will therefore not be provided.

To fabricate the wound electrode assembly 80, the positive electrode sheet 10 and the negative electrode sheet 20 are stacked on each other with a separator sheet 40 interposed therebetween. When this is done, the positive electrode sheet 10 and the negative electrode sheet 20 are overlaid partially shifted from each other in the width direction so as to expose the positive electrode mixture layer-free region of the positive electrode sheet 10 and the negative electrode mixture layer-free region of the negative electrode sheet 20, respectively, at the two sides in the width direction of the separator sheet 40. The resulting layered stack is wound and the obtained winding is then pressed and flattened from the side direction to fabricate the flat wound electrode assembly 80.

A wound core part 82 (i.e., the part where the positive electrode mixture layer 14 of the positive electrode sheet 10, the negative electrode mixture layer 24 of the negative electrode sheet 20, and the separator sheet 40 are tightly stacked) is formed in the central region, considered in the winding axial direction, of the wound electrode assembly 80. In addition, the electrode mixture layer-free regions of the positive electrode sheet 10 and the negative electrode sheet 20 are respectively exposed to the outside of the wound core part 82 at the two edges, considered in the winding axial direction, of the wound electrode assembly 80. A positive electrode lead terminal 10A and a negative electrode lead terminal 20A are attached, respectively, to the exposed region 84 on the positive electrode side (i.e., the region where the positive electrode mixture layer 14 is not formed) and to the exposed region 86 on the negative electrode side (i.e., the region where the negative electrode mixture layer 24 is not formed) and are electrically connected, respectively, to the positive electrode terminal 70 and the negative electrode terminal 72.

The wound electrode assembly 80 with the indicated structure is introduced into the container main body 52 and a suitable nonaqueous electrolyte solution is introduced (injected) into this container main body 52. The opening in the container main body 52 is sealed with the lid 54, for example, by welding, to complete the fabrication (assembly) of the lithium secondary battery 100 according to this embodiment. The sealing process for the container main body 52 and the electrolyte solution introduction (injection) process can be carried out using the same techniques as heretofore used for the fabrication of lithium secondary batteries. The battery is then conditioned (initial charge/discharge). Steps such as, for example, venting and quality inspection, may be carried out as necessary.

The thusly fabricated lithium secondary battery 100 can exhibit improved battery characteristics because it has been fabricated using a negative electrode sheet that is provided with the herein disclosed magnetically oriented graphite. For example, it can satisfy at least one of the following (and preferably all of the following): a high initial capacity, excellent high-temperature storage characteristics, and excellent input/output characteristics.

The present invention is specifically described below through examples, but this should not be taken to imply that the present invention is limited to or by these examples.

[The Negative Electrode Sheet]

Example 1

A negative electrode mixture was produced by mixing a natural graphite as the negative electrode active material, SBR as a binder, and CMC as a thickener in water at a mass ratio among these materials of 98:1:1. This negative electrode mixture was made to coat, at a coating rate of 10 mg/cm² per side, a 10 µm-thick copper foil (negative electrode current collector) and a magnetic field was applied to the thusly coating negative electrode mixture with the magnetic lines of force oriented in the width direction of the current collector. The magnetic field was applied using the magnetic field application apparatus 130 (magnets 132A, 132B) shown in FIG. 3. The distance between the magnets 132A, 132B was 20 cm; the magnetic field strength was 0.75 T; and the magnetic field exposure time was approximately 2.0 seconds. After the application of the magnetic field, the negative electrode mixture was dried to obtain a negative electrode sheet in which a negative electrode mixture layer was formed on both sides of the negative electrode current collector. Drying was followed by rolling (pressing) to provide a density for the negative electrode mixture layer of approximately 1.4 g/cm³.

Example 2

A negative electrode sheet was fabricated as in Example 1, but in this case, rolling (pressing) was carried out so as to bring the density of the negative electrode mixture layer to approximately 1.1 g/cm³.

Example 3

A negative electrode sheet was fabricated as in Example 1, but in this case, rolling (pressing) was carried out so as to bring the density of the negative electrode mixture layer to approximately 1.7 g/cm³.

Example 4

A negative electrode sheet was fabricated as in Example 1, but in this case, exposing the negative electrode mixture made to coat the current collector first to a magnetic field in which the magnetic lines of force were oriented in the direction orthogonal to the plane of the current collector and thereafter exposing to a magnetic field in which the magnetic lines of force were oriented in the width direction of the current collector were carried out. These magnetic fields were applied using the magnetic field application apparatus 130 (magnets 132A, 132B, 134A, 134B) shown in FIG. 5. The distance between the magnets 134A, 134B was 3.0 cm; the magnetic field strength was 0.75 T; and the magnetic field exposure time was approximately 2.0 seconds. The conditions for the magnets 132A, 132B were the same as in Example 1.

Comparative Example 1

A negative electrode sheet was fabricated as in Example 1, but without the application of the magnetic field to the negative electrode mixture.

Comparative Example 2

A negative electrode sheet was fabricated as in Example 2, but without the application of the magnetic field to the negative electrode mixture.

Comparative Example 3

A negative electrode sheet was fabricated as in Example 3, but without the application of the magnetic field to the negative electrode mixture.

Test lithium secondary batteries were fabricated using the negative electrode sheets obtained in Examples 1 to 4 and Comparative Examples 1 to 3 and their properties were evaluated. The fabrication of these test lithium secondary batteries was carried out as follows.

[The Positive Electrode Sheet]

A positive electrode mixture was prepared by mixing $LiNi_{1/3}Mn_{1/3}Co_{1/3}O_2$ as the positive electrode active material, acetylene black (AB) as an electroconductive material, and PVDF as a binder in NMP at a mass ratio among these materials of 90:8:2. This positive electrode mixture was made to coat, at a coating rate of 20 mg/cm² per side, a 15 µm-thick aluminum foil (positive electrode current collector) followed by drying to provide a positive electrode sheet in which a positive electrode mixture layer was formed on both sides of the positive electrode current collector. Drying was followed by rolling (pressing) to provide a density for the positive electrode mixture layer of approximately 2.8 g/cm³.

[The Lithium Secondary Battery]

The positive electrode sheet and negative electrode sheet described above were wound with two sheets of a separator (the separator used had a 10 µm-thick porous polypropylene single layer structure) 40 interposed therebetween, and this winding was pressed and flattened from the side direction to fabricate a flat wound electrode assembly. The thusly obtained wound electrode assembly and a nonaqueous electrolyte solution were introduced in a box-shaped metal battery case and the opening of the battery case was sealed airtight. For the nonaqueous electrolyte solution, a nonaqueous electrolyte solution was used in which $LiPF_6$ was incorporated as the supporting electrolyte at a concentration of approximately 1 mol/liter in a mixed solvent that contained ethylene carbonate (EC), ethyl methyl carbonate (EMC), and dimethyl carbonate (DMC) at a volume ratio of 1:1:1. The test lithium secondary battery was assembled proceeding as described above.

[Measurement of the Initial Capacity]

Each of the test lithium secondary batteries obtained as described above according to Examples 1 to 4 and Comparative Examples 1 to 3 was adjusted to a 50% SOC (state of charge) by charging to a voltage of 4.2 V at a current value of 1 C at a temperature of 25° C. After resting for 5 minutes, the thusly charged battery was discharged at 25° C. to a voltage of 2.5 V at a current value of 1 C. Charging was carried out to a voltage of 4.2 V at a current value of 1 C followed by charging in constant voltage mode until the current value dropped to 0.1 C. After resting for 20 minutes, the thusly charged battery was discharged at 25° C. to a voltage of 2.5 V at a current value of 1 C and was then discharged in constant voltage mode until the current value dropped to 0.1 C. The discharge capacity when this was done was measured to give the initial capacity.

[High-Temperature Storage Test]

After the initial capacity had been measured as described above, a high-temperature storage test was also run on each of the test lithium ion batteries. Specifically, each of the test lithium secondary batteries was stored for 100 days at 50° C. followed by the execution of a charge/discharge procedure under the same conditions as in the above-described measurement of the initial capacity in order to measure the discharge capacity after high-temperature storage. In addition, the discharge capacity after the high-temperature storage test and the initial capacity were used to calculate the post-durability testing capacity retention rate ("discharge capacity after the high-temperature storage test/initial capacity"×100). The results are given in Table 1.

TABLE 1

|  | Example 1 | Example 2 | Example 3 | Example 4 | Comparative Example 1 | Comparative Example 2 | Comparative Example 3 |
|---|---|---|---|---|---|---|---|
| magnetic orientation | + | + | + | ++ (twice) | x | x | x |
| mixture density (g/cm$^3$) | 1.4 | 1.1 | 1.7 | 1.4 | 1.4 | 1.1 | 1.7 |
| initial capacity (Ah) | 4.05 | 4.14 | 4.00 | 4.12 | 4.00 | 4.11 | 3.87 |
| capacity retention rate (%) | 77.3 | 78.8 | 72.4 | 77.2 | 74.9 | 77.6 | 69.1 |

As is clear from Table 1, the battery according to Example 1, in which application of a magnetic field was performed as described above, had both a better initial capacity and a better capacity retention rate after high-temperature storage than did the battery of Comparative Example 1, in which this application of a magnetic field was not carried out. The reason for this is thought to be as follows: fissuring of the graphite occurred in Comparative Example 1 during rolling of the negative electrode mixture layer, resulting in consumption of the lithium ion due to the formation of new surfaces in the active material; in Example 1, in contrast to this, this fissuring of the graphite during rolling was favorably suppressed due to the execution of the previously described magnetic orientation. As a result, it could be confirmed that, through the application to the negative electrode mixture made to coat the current collector of a magnetic field in which the magnetic lines of force were oriented in one direction parallel to the plane of the current collector, a lithium secondary battery was obtained that had a high initial capacity and a high capacity retention rate after high-temperature storage.

In the batteries according to Comparative Examples 1 to 3, fissuring of the graphite by interference was made easier as the post-rolling mixture density rose, leading to a declining trend for the initial capacity and the capacity retention rate after high-temperature storage. In contrast to this, the extent of the decline in the initial capacity and the capacity retention rate after high-temperature storage that accompanied the increase in the post-rolling mixture density was improved for the batteries according to Examples 1 to 3 in comparison to Comparative Examples 1 to 3. That is, the magnetic orientation-induced suppression of the performance deterioration is greater at higher post-rolling mixture densities. For the batteries tested here, a high initial capacity of at least 4 Ah (4 Ah to 4.14 Ah) and a high post-durability testing capacity retention rate of at least 72% (72.4% to 78.8%) could be realized through the application of the magnetic field as described above and using a post-rolling mixture density of not more than 1.7 g/cm$^3$. In particular, a very high initial capacity of at least 4.05 Ah (4.05 Ah to 4.14 Ah) and a very high post-durability testing capacity retention rate of at least 77% (77.3% to 78.8%) could be realized through the application of the magnetic field as described above and using a post-rolling mixture density of not more than 1.4 g/cm$^3$.

Viewed in terms of increasing the energy density of the negative electrode, the post-rolling mixture density is suitably at least approximately 1 g/cm$^3$ and is preferably at least 1.1 g/cm$^3$, more preferably at least 1.4 g/cm$^3$, and particularly preferably at least 1.7 g/cm$^3$. The present construction can suppress the graphite fissuring and cracking that accompany this densification. On the other hand, viewed in terms of improving the initial capacity and improving the post-durability testing capacity retention rate, the post-rolling mixture density is suitably not more than approximately 2 g/cm$^3$ and is preferably not more than 1.7 g/cm$^3$, more preferably not more than 1.4 g/cm$^3$, and particularly preferably not more than 1.1 g/cm$^3$. Viewed in terms of satisfying both a high energy density as well as the initial capacity and the post-durability testing capacity retention rate, the post-rolling mixture density is suitably approximately 1 g/cm$^3$ to 2 g/cm$^3$ and is preferably 1.1 g/cm$^3$ to 1.7 g/cm$^3$, more preferably 1.2 g/cm$^3$ to 1.6 g/cm$^3$, and particularly preferably 1.3 g/cm$^3$ to 1.5 g/cm$^3$.

Moreover, comparing Example 1 with Example 4, the initial capacity and capacity retention rate after high-temperature storage were further improved by the application in two stages of a magnetic field in the direction orthogonal to the current collector and a magnetic field in the width direction of the current collector. That is, it could be confirmed that a lithium secondary battery having a higher initial capacity and a higher capacity retention rate after high-temperature storage is obtained through the application of a magnetic field in which the magnetic lines of force are oriented in the direction orthogonal to the plane of the current collector followed by the application of a magnetic field in which the magnetic lines of force are oriented in the width direction of the current collector.

The present invention has been described in the preceding by suitable embodiments, but this description is nonlimiting and various modifications are of course possible. For example, the battery type is not limited to the lithium secondary battery that has been considered in the preceding, and may be various batteries having different electrolytes or different constituent materials for the electrode assembly, for example, nickel-hydride batteries and nickel-cadmium batteries, or may be an electric double-layer capacitor.

Figure 9:
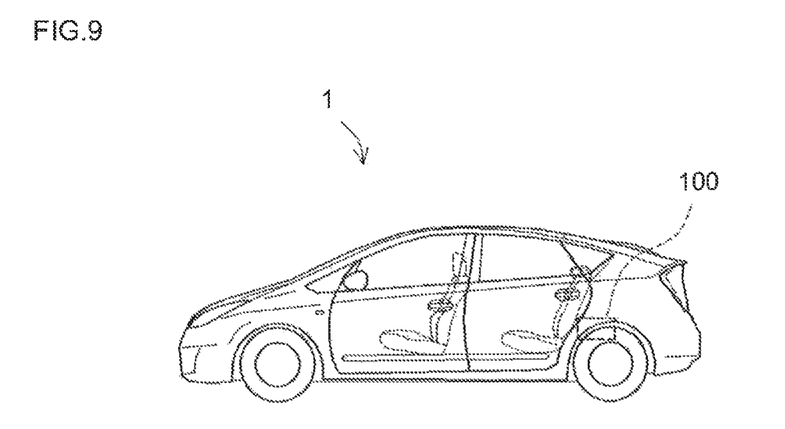
FIG. 9 is a side view that shows a vehicle equipped with a nonaqueous electrolyte secondary battery according to an embodiment of the present invention.

All of the herein disclosed nonaqueous electrolyte secondary batteries have excellent properties suitable for application as a vehicle-mounted battery and particularly an excellent initial capacity and excellent high-temperature storage characteristics. Thus, the present invention provides, as shown in FIG. 9, a vehicle 1 that is equipped with any herein disclosed nonaqueous electrolyte secondary battery 100 (this can take the form of a battery pack in which a plurality of the nonaqueous electrolyte secondary batteries are connected). In particular, a vehicle (for example, an automobile) is provided that has such a nonaqueous electrolyte secondary battery as a power source (typically a power source for a hybrid vehicle or an electric vehicle).

INDUSTRIAL APPLICABILITY

The present invention can provide a nonaqueous electrolyte secondary battery in which graphite fissuring during rolling of the negative electrode mixture layer is prevented and a deterioration in the performance of the battery is thereby suppressed and can provide a favorable method of manufacturing this nonaqueous electrolyte secondary battery.

The invention claimed is:

1. A method of manufacturing a nonaqueous electrolyte secondary battery that has a positive electrode and a negative electrode, the method comprising:
   a coating step of coating a current collector with a graphite-containing negative electrode mixture;
   a magnetic field application step of applying, to the negative electrode mixture made to coat the current collector in the coating step, a magnetic field in which magnetic lines of force are oriented in one direction parallel to a wide side plane of the current collector coated with the negative electrode mixture;
   a drying step of drying the negative electrode mixture to which the magnetic field has been applied in the magnetic field application step; and
   a rolling step of rolling a negative electrode mixture layer resulted from the drying step,
   wherein the current collector is an elongated current collector and, in the magnetic field application step, a magnetic field is applied in which the magnetic lines of force are oriented in a width direction of the elongated current collector, wherein the width direction is defined as the direction that is orthogonal to the length direction of the elongated current collector and that runs from one long edge of the current collector to the other long edge.

2. The method of manufacturing a nonaqueous electrolyte secondary battery according to claim 1, wherein, in the magnetic field application step, a magnetic field is first applied in which the magnetic lines of force are oriented in a direction orthogonal to the wide side plane of the current collector and a magnetic field is thereafter applied in which the magnetic lines of force are oriented in one direction parallel to the wide side plane of the current collector.

3. The method of manufacturing a nonaqueous electrolyte secondary battery according to claim 1, wherein the density of the negative electrode mixture layer after the rolling step is at least 1.1 g/cm$^3$.

4. The method of manufacturing a nonaqueous electrolyte secondary battery according to claim 1, wherein the strength of the magnetic field applied to the negative electrode mixture in the magnetic field application step is at least 0.5 T.

5. The method of manufacturing a nonaqueous electrolyte secondary battery according to claim 1, wherein the graphite is flat flake graphite.

6. A nonaqueous electrolyte secondary battery that has a positive electrode and a negative electrode, wherein
   the negative electrode has an elongated current collector and a negative electrode mixture layer that contains at least graphite and is formed in a length direction of the current collector,
   the graphite in the negative electrode mixture layer is arranged such that the (002) plane of at least 50 mass % of the graphite is parallel to a width direction of the current collector, wherein the width direction is defined as the direction that is orthogonal to the length direction of the elongated current collector and that runs from one long edge of the current collector to the other long edge, and the graphite in the negative electrode mixture layer is arranged such that the (002) plane of at least 50 mass % of the graphite is orthogonal to a wide side plane of the current collector and parallel to the width direction of the current collector.

7. The nonaqueous electrolyte secondary battery according to claim 6, wherein the density of the negative electrode mixture layer is at least 1.1 g/cm$^3$.

* * * * *